United States Patent
Dawidowsky et al.

(10) Patent No.: US 7,304,968 B2
(45) Date of Patent: Dec. 4, 2007

(54) AD-HOC ESTABLISHED DEVICE NETWORK

(75) Inventors: Frank Dawidowsky, Stuttgart (DE); Lothar Stadelmeier, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1009 days.

(21) Appl. No.: 10/232,302

(22) Filed: Aug. 30, 2002

(65) Prior Publication Data

US 2003/0043765 A1    Mar. 6, 2003

(30) Foreign Application Priority Data

Sep. 3, 2001    (EP)    ................... 01121099

(51) Int. Cl.
*H04L 12/56* (2006.01)

(52) U.S. Cl. ...................... 370/331; 370/338

(58) Field of Classification Search ................ 370/331, 370/332, 338
See application file for complete search history.

(56) References Cited

U.S. PATENT DOCUMENTS

| | | | |
|---|---|---|---|
| 6,757,517 B2 * | 6/2004 | Chang | 455/3.05 |
| 6,842,460 B1 * | 1/2005 | Olkkonen et al. | 370/465 |
| 6,980,522 B2 * | 12/2005 | Boyle | 370/252 |
| 7,110,366 B2 * | 9/2006 | Hulyalkar et al. | 370/252 |

OTHER PUBLICATIONS

"Broadband Radio Access Networks (Bran): Hiperlan Type 2: System Overview" ETSI R 101 683 V1.1.1, Feb. 8, 2000, pp. 1-20, XP002176358.

"Broadband Radio Access Network (Bran): Hiperlan Type 2: Data Link Control (DLC) Layer: Part 4: Extension for Home Environment" ETSI Technical Report, ETSI TR 101 683 V1.1.1. 'Online! Dec. 2000, pp. 61-69, XP002184083.

Royer E M et al: "A Review of Current Routing Protocols for Ad Hoc Mobile Wireless Networks" IEEE Personal Communications, IEEE Communications Society, US, vol. 6, No. 2, Apr. 1999, pp. 46-55, XP000823968.

* cited by examiner

*Primary Examiner*—Hassan Kizou
*Assistant Examiner*—Jay P. Patel
(74) *Attorney, Agent, or Firm*—Oblon, Spivak, McClelland, Maier & Neustadt, P.C.

(57) ABSTRACT

In an ad-hoc established device network, a profile based handover of the network control functionality is performed whenever a new device (15) requests association with the network and the central controller (16) does not support the profile of the new device (15). A database is searched for a controller-capable device that supports both the profiles of the network devices and the profile of the new device. The former central controller (16) passes the control functionality to the controller-capable device (17), which becomes the new central controller (24). Thus it is possible to associate the new device (15) with the network. The invention allows to integrate devices supporting different profiles into a common network.

21 Claims, 3 Drawing Sheets

Before Hand-Over

After Hand-Over

AD-HOC ESTABLISHED DEVICE NETWORK

The invention is related to ad-hoc established device networks, which comprise a central controller and a set of terminal devices. In particular, the invention is related to a method for associating a new device with the device network, and to a central controller for controlling a set of terminal devices in an ad-hoc established device network.

For a variety of home multimedia applications and business applications, it is important to establish networks, preferably wireless networks, for exchanging data and messages between different devices that are part of the network. In a typical business application scenario, a mobile terminal gets services over a fixed corporate or public infrastructure. In an exemplary home application scenario, a low-cost and flexible networking is supported to interconnect wireless digital consumer devices.

The ETSI Project BRAN (Broadband Radio Access Networks) has defined the standard HIPERLAN (High Performance Radio Local Area Network), which provides high-speed multimedia communications between different broadband core networks and mobile terminals. HIPERLAN/2 provides a flexible platform for a variety of business and home applications that can support a set of bit rates up to 54 Mbit/s. The HIPERLAN/2 standard is an example how data can be transmitted between different devices in a wireless network. The invention is not limited to wireless networks according to the HIPERLAN/2 standard, though. The invention is not limited to wireless networks. It can also be applied in wired networks.

A typical device network comprises several devices, with one of the devices acting as a central controller that controls the other devices which act as terminal devices When different devices are brought within reach of each other, they start exchanging messages and establish a so-called ad-hoc network, with one of the devices assuming the control functionality The first device on the ad-hoc network is taking the control functionality of the network. In case more than one controller-capable device exist in the network. any of these devices could become the first device on the network and thus the network's central controller.

Between the devices data is transmitted according to predefined transmission profiles, which describe all transmission- and connection-related parameters that are mandatory for certain device types. A transmission profile defines the transmission rate, the requirements for the transmission quality, the error correction mode, etc. The transmission profile specifies whether a so-called "direct mode" with direct data exchange between two terminal devices is allowed, or whether the data traffic between two terminal devices has to be routed via the central controller device.

At the moment, two different transmission profiles are mainly in use: a "business applications profile" and a "home applications profile". In the business applications profile, there is no "direct mode" for directly exchanging messages between two terminal devices. All the data traffic is routed via a central access point. Contrary to that, in the home applications profile, the "direct mode" is allowed. The transmission rate defined by the "home applications profile" is higher than that defined by the "business applications profile".

A problem arises if an ad-hoc network is established with a central controller which only supports a certain transmission profile, e.g. the business applications profile. When a new device which only supports a different transmission profile, e.g. the home applications profile, requests to be associated to the network, the central controller will deny the association. It is impossible for the central controller to control a terminal device if the central controller does not support the transmission profile of said terminal device. In this case, it is not possible to establish a network comprising devices with a business applications profile as well as devices with a home applications profile.

It is an object of the invention to provide a method and means for associating a new device with an ad-hoc established device network even if the central controller does not support the new device's profile.

According to the invention, the method for associating a new device with an ad-hoc established device network, with said device network comprising a central controller and a set of terminal devices, comprises a step of checking whether the central controller supports the transmission profile of a new device which requests association. In case the transmission profile of the new device is not supported, a database is searched for a terminal device which is capable of acting as a controller and which supports both the transmission profiles of the network devices and the transmission profile of the new device. In case at least one such terminal device is found, a handover of the control functionality is performed in order to establish said terminal device as the new central controller.

Whenever a new device requests association with a network and the central controller does not support the profile of the new device, a profile based handover of the network control functionality is performed. The device that is capable of acting as a controller both for the network devices and for the new device can be found by means of a database. The former central controller, which is unable to control the new device, passes the control functionality to the controller-capable device, which becomes the new central controller. This new central controller is capable of acting as a controller for the whole network, and it can also control the new device. Thus it is possible to associate the new device with the network.

The invention allows to integrate devices supporting different profiles into a common network, if there exists at least one controller-capable device that is capable of supporting all the different profiles. The search for the new central controller and the handover of the controller functionality take place automatically. Instead of denying the association of the new device as in prior art solutions, a profile based handover of the control functionality is performed, and then it is possible to associate the new device. The handover takes place so quickly that the user assumes that the new device has been associated immediately The inventive method for finding the suitable central controller and for transferring the control functionality to this new central controller removes one big disadvantage of ad-hoc established networks, which is that the first device on the ad-hoc network automatically becomes the central controller of the network. By means of the invention, the controller functionality can be quickly transferred to the most suitable controller device. Instead of using a trial-and-error strategy, the correct controller is determined with a database, and then only one handover has to be performed.

The invention allows to associate a new device supporting a business applications profile with a central controller which only supports the home applications profile. Vice versa, a new device which only supports the home applications profile can be associated with a central controller which only supports the business applications profile. Therefore, the invention improves the interoperability of various devices supporting different profiles.

Preferably, said new device is associated with the new central controller. The new central controller supports the profile of the new device, and for this reason it is possible to integrate the new device into the network.

Preferably, the former central controller is associated as a terminal device with the new central controller. After the handover, the former central controller still is part of the network.

According to a preferred embodiment of the invention, the set of profiles comprises a consumer electronics profile and a business profile. At this moment, either one or two of these profiles are supported by most manufacturers. By using these profiles, interoperability between different devices is assured.

Preferably, the search for a controller-capable terminal device is performed in a database which is kept on part of the central controller. Whenever a new terminal requests association with the ad-hoc network, the central controller is informed about the controller-capability of the new device, and about the profiles supported by the new device. The central controller thus automatically obtains the information for building up, maintaining and updating the database.

Preferably, said database is transmitted from the former central controller to the new central controller whenever a handover of the control functionality is performed. As soon as the control functionality is transferred to the new central controller, the new central controller receives all the association requests from new devices The new central controller possesses all the information for updating and maintaining the database. Therefore the database should be transmitted to the new central controller.

Preferably the database comprises, for each device of the network, a record indicating whether a device is capable of acting as a controller, and which transmission profiles are supported by said device. Whenever a new device is associated with the network, a new record is added to said database. The information required for the new record is contained in the new device's association request, and at this point of time, the new record is added.

According to a preferred embodiment of the invention, each device of the network is notified that it is no longer controlled by the former central controller, and that it is furtheron controlled by the new central controller, whenever a handover of the control functionality is performed. This makes sure that at each point of time, it is clear which controller controls the device. Interferences between the former central controller and the new central controller can thus be avoided.

Preferably the network is a wireless network, and in particular a network according to the HIPERLAN standard.

Further features and advantages of a preferred embodiment according to the present invention will be explained below in conjunction with the accompanying drawings, in which FIG. 1A shows the structure of the device network before the control functionality has been handed over;

Figure 1A:
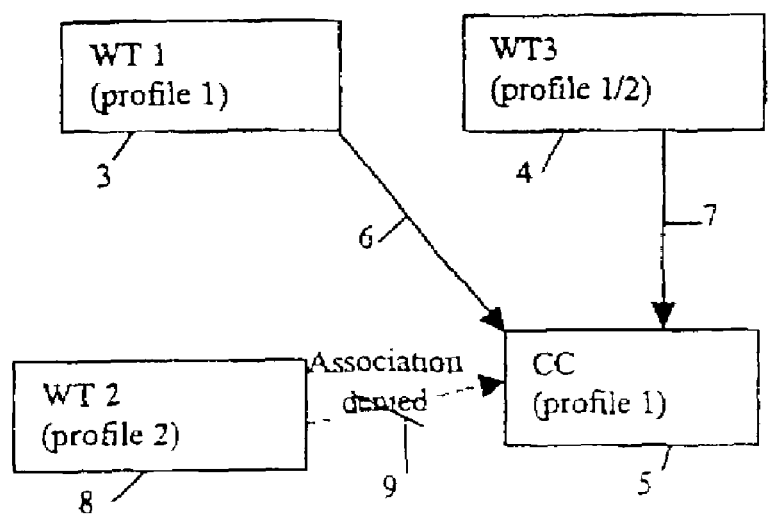
FIG. 1B shows the structure of the device network after the control functionality has been handed over.

In FIG. 1, the wireless terminals 3 and 4, together with the central controller 5, form a wireless ad-hoc established network. The central controller supports the profile 1, which describes all transmission- and connection-related parameters that are mandatory for certain device types. The wireless terminal 3 also supports the profile 1, and therefore the central controller 5 can control (6) the wireless terminal 3. In the wireless terminal 4, both profile 1 and profile 2 are supported. For this reason, wireless terminal 4 can either be controlled by a central controller supporting profile 1 or by a central controller supporting profile 2. The central controller 5 supports the profile 1 and is therefore capable of controlling (7) the wireless terminal 4.

In FIG. 1A, the wireless terminal 8 requests association with the ad-hoc established device network. The wireless terminal 8 only supports profile 2, and the central controller 5 only supports profile 1. For this reason, it is impossible to control the wireless terminal 8 by the central controller 5. The association of the wireless terminal 8 with the device network is therefore denied (9).

According to the invention, the central controller 5 now searches for a wireless terminal which is capable of acting as a controller, and which supports the profiles of the already associated devices as well as the profile of the new device. If such a device exists, and if the link quality of this device is sufficient, the acting central controller initiates a handover of the control functionality to this device.

In FIG. 1A, wireless terminal 4 is capable of acting as a central controller. Wireless terminal 4 supports profile 1, which is the profile of the already associated devices, and profile 2, which is the profile of the new wireless terminal 8. Therefore, the wireless terminal 4 is capable of acting as a controller for the devices 3, 5, and 8.

Figure 1B:
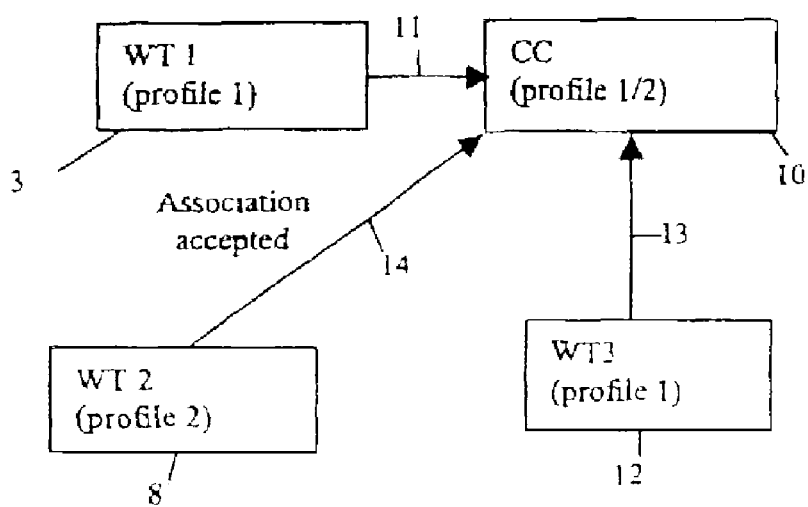

Next, the control functionality is handed over from the former central controller 5 to the former wireless terminal 4, which becomes the new central controller 10. FIG. 1B shows the structure of the network after the handover has been performed The wireless terminal 3 is now controlled (11) by the new central controller 10, which supports profile 1 The former central controller 5 has become a wireless terminal 12 Wireless terminal 12 is also controlled (13) by the new central controller 10. With the new network structure, it is possible to associate the wireless terminal 8 with the network, because both the wireless terminal 8 and the new central controller 10 support profile 2. After the association, wireless terminal 8 is controlled (14) by the central controller 10.

Figure 2:
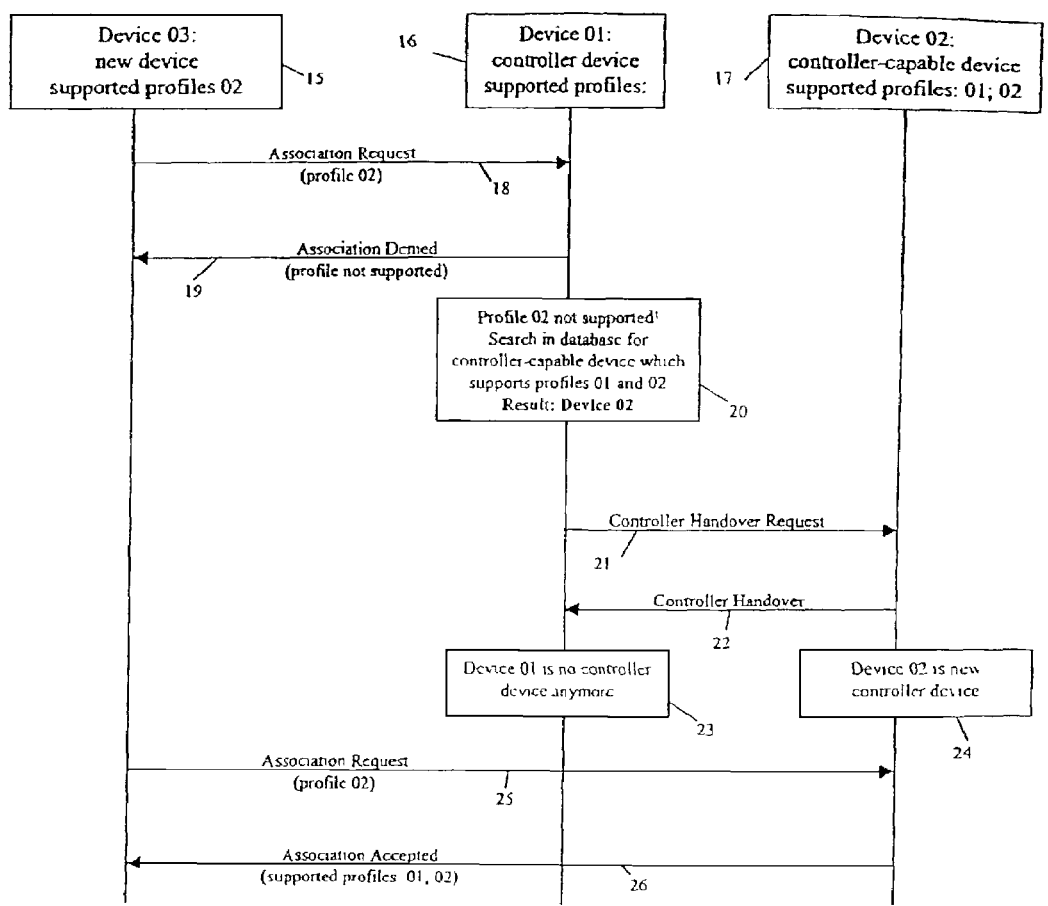
FIG. 2 shows the messages that are exchanged between the network devices when the association of a new device is denied.

In FIG. 2, the messages exchanged between the new wireless terminal 15, the central controller 16 and the controller-capable device 17 are shown. The new wireless terminal 15 sends an association request 18 to the central controller 16. With the association request 18, the central controller is informed about the profiles the new wireless terminal 15 supports. The new wireless terminal supports profile 2. The central controller 16 supports profile 1, but it does not support profile 2. Therefore, the central controller 16 sends an association denied message 19 to the new wireless terminal 15.

On part of the central controller 16, a database is maintained which comprises records for each of the wireless terminals which are controlled by the central controller 16. For each wireless terminal, there exists a record indicating whether the wireless terminal is capable of acting as a controller. Furtheron, the record indicates which profiles are supported by the respective device. Whenever a new device is associated with the network, a record with the parameters of the new device is added to the database.

The central controller 16 does not support the profile 2, and therefore, in step 20, the central controller searches the database for a controller-capable device which supports both profile 1 and profile 2. The result of the search is that the controller-capable device 17 fulfills all the requirements for acting as a controller for all the devices of the network and for the new wireless terminal 15, because the controller-capable device 17 supports both profile 1 and profile 2.

In order to initiate the handover of the control functionality, a Controller Handover Request 21 is sent from the former central controller 16 to the controller-capable device 17. The controller-capable device 17 accepts the handover request by returning a Controller Handover message 22 to the former central controller 16 The former central controller 16 notifies all the devices associated with the network that it will no longer control them, and that the control functionality will be passed to the controller-capable device 17. Additionally, the former central controller 16 notifies its own convergence layer that it will stop acting as a controller.

So far, the former central controller 16 has been responsible for updating and maintaining the database containing information about the controller-capabilities of the various devices. This database has to be transmitted to the controller-capable device 17 when the control functionality is transferred to the controller-capable device 17. Then, in step 23, the former central controller 16 stops acting as a controller of the network.

In step 24 the controller-capable device 17 becomes the new central controller of the network. From now on, the new central controller is responsible for updating and maintaining the database. The former central controller 16 becomes an associated wireless terminal that is controlled by the new central controller. All the devices associated with the network are notified that the new central controller has taken over the control functionality, and that they will furtheron be controlled by the new central controller.

The new terminal device 15 has not been associated with the network yet, because the former central controller 16 has been unable to support profile 2. The new terminal device 15 sends another Association Request 25 to the new central controller. The new central controller supports profile 1 as well as profile 2, and it is therefore capable of controlling the new terminal device 15, which supports profile 2. The new central controller sends an Association Accepted message 26 to the new terminal device 15. The new terminal device 15 will furtheron be controlled by the new central controller.

Figure 3:
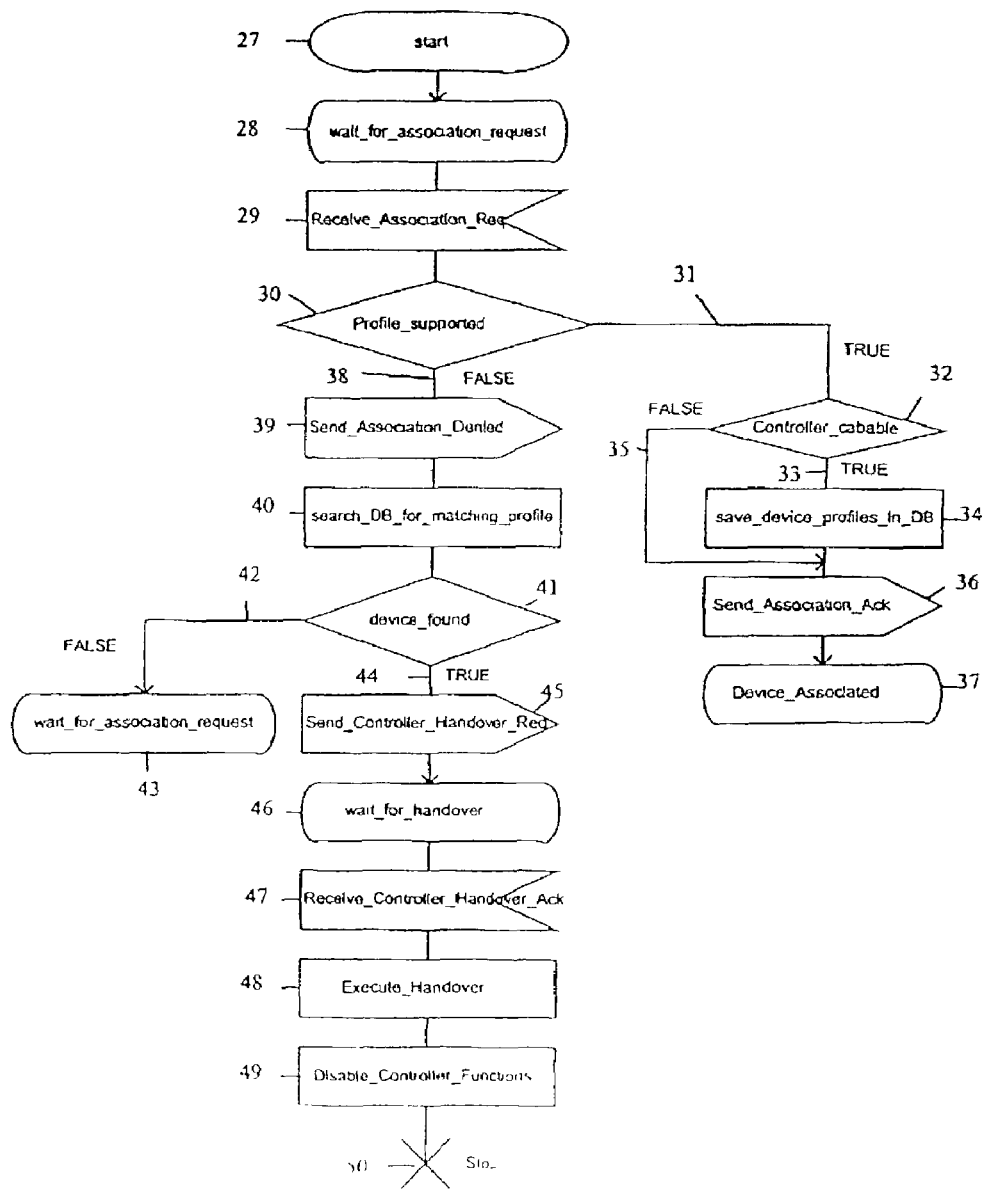
FIG. 3 shows a flow chart for realizing the profile based handover according to the invention.

In FIG. 3, a flow chart for implementing the invention is shown. The program represented by this flow chart can either be implemented in hardware or in software. The program is executed on part of the device that acts as the central controller of the network.

When the routine is started (27), it enters the wait_for_association_request mode 28. Let us assume that a new terminal device sends an association request to the central controller in order to inform the central controller about the transmission profiles supported by the new terminal device. In step 29, Receive_Association_Req. the central controller receives the association request. In step 30, Profile_supported, the central controller checks whether it supports the new device's profile.

In case the profiles supported by the central controller and the profile of the new device match (31, Profile_supported=TRUE), it is not necessary to perform a handover of the control functionality. The central controller can act as a central controller for the new terminal device. In step 32, the central controller checks whether the new device is a controller-capable device or not. In case the new device is a controller-capable device (33, Controller_capable=TRUE), the local database maintained by the central controller has to be updated. In step 34, save_device_profiles_in_DB, a record for the new device is added to the database. The record contains information about the new device's controller capability and about the profiles supported by the new device. In case the result of the check performed in step 32 is that the new device is not a controller-capable device (35, Controller_capable=FALSE), the central controller's local database does not have to be updated, because the local database only contains entries for devices that are controller-capable.

The central controller supports the profile of the new device, and therefore, in step 36, an association acknowledgement Send_Association_Ack is sent to the new device. The routine enters the Device_Associated mode 37.

The situation becomes more difficult if the central controller does not support the profile of the new device (38, Profile_supported=FALSE), because in this case, it is necessary to perform a handover of the control functionality. Before doing this, an association denied message 39, Send_Association_Denied, is forwarded to the new device, because the new device can not be controlled by the actual central controller.

Next, in step 40, search_DB_for_matching_profile, the central controller searches its local database for a controller-capable device to which the control functionality should be transferred. The controller-capable device has to support the profiles of all the devices which form the network. Additionally, the controller-capable device has to support the new device's profile. In step 41, device_found, it is checked whether a suitable controller-capable device has been found. In case no suitable controller-capable device has been found (42, device_found=FALSE), it is not possible to associate the new device with the network. The routine enters the wait_for_association_request mode 43 again.

In case a suitable controller-capable device has been found in the database (44, device_found=TRUE), a handover of the control functionality from the central controller to the controller-capable device is initiated. In step 45, a controller handover request Send_Controller_Handover_Req is sent from the central controller to the controller-capable device. Then, the central controller enters the wait_for_handover mode 46. Before the handover of the control functionality can be performed, the controller-capable device has to accept becoming the network's new central controller by sending a controller handover acknowledgement to the central controller. In step 47, Receive_Controller_Handover_Ack, the central controller receives the acknowledgement of the controller-capable device.

Now, in step 48, Execute_Handover, the control functionality is transferred from the central controller to the controller-capable device, which becomes the new central controller. Additionally, the database is transferred from the former central controller to the new central controller. As soon as the controller-capable device acts as the new central controller, it also assumes the responsibility for maintaining and updating the database.

In step 49, Disable_Controller_Functions, the former central controller stops acting as a controller of the network. The former central controller sends a notification to all the devices of the network in order to inform these devices that they are no longer controlled by the former central controller. The former central controller becomes a terminal device that is associated with the network and that is controlled by the new central controller.

The new central controller supports all the required protocols for controlling the whole network. It is possible for the new device to associate with the network because the new central controller supports its profile. In step 50, the routine is ended.

The invented claimed is:

1. A method for associating a new device with an ad-hoc established device network comprising a central controller and a set of terminal devices, comprising:
   checking whether the central controller supports a transmission profile of a new device which requests association, wherein the transmission profile indicates all transmission and connection related parameters that are mandatory for the new device;
   in case the transmission profile of the new device is not supported, searching a database for a terminal device which is capable of acting as a controller and which supports both transmission profiles of the set of terminal devices and the transmission profile of the new device;
   in case at least one such terminal device is found, performing a handover of a control functionality in order to establish said terminal device as the new central controller.

2. The method of claim 1, further comprising:
   associating said new device with the new central controller.

3. The method of claim 1, further comprising:
   associating the former central controller as a terminal device with the new central controller.

4. The method of claim 1, wherein the set of profiles comprises a consumer electronics profile and a business profile.

5. The method of claim 4, wherein said consumer electronics profile comprises a direct mode allowing for direct links between the network devices.

6. The method of claim 4, wherein said business profile only allows for links between the network devices acid a central access point.

7. The method of claim 1, wherein the search for a controller-capable terminal device is performed in a database which is kept on part of the central controller.

8. The method of claim 1, further comprising:
   transmitting said database from the former central controller to the new central controller whenever a handover of the control functionality is performed.

9. The method of claim 1, wherein the database comprises, for each device of the network, a record indicating whether a device is capable of acting as a controller, and which transmission profiles are supported by said device.

10. The method of claim 9, further comprising:
    adding a new record to said database whenever a new device is associated with the network.

11. The method of claim 1, further comprising:
    notifying each device of the network that it is no longer controlled by the former central controller , and that it is furtheron controlled by the new central controller, whenever a handover of the control functionality is performed.

12. The method of claim 1, wherein the network being a wireless network.

13. The method of claim 12, wherein the network is a wireless network according to the HIPERLAN/2 standard.

14. A central controller for controlling a set of terminal devices in an ad-hoc established device network, comprising:
    a database configured to store information about the controller capability of said terminal devices, and about the transmission profiles supported by said terminal devices, wherein the information about the transmission profiles indicates all transmission and connection related parameters that are mandatory for the terminal devices,
    a checking unit configured to check whether the central controller supports the transmission profile of a new terminal device which is to be associated with the network, and for searching said database for a terminal device which is capable of acting as a controller and which supports both the transmission profiles of the network devices and the transmission profile of the new device,
    a handover unit configured to perform a handover of the control functionality to a controller-capable terminal device in case the central controller is not capable of supporting the transmission profile of said new terminal device.

15. The central controller of claim 14, wherein the set of profiles comprises a consumer electronics profile and a business profile.

16. The central controller of claim 15, wherein said consumer electronics profile comprises a direct mode allowing for direct links between the network devices.

17. The central controller of claim 15, wherein said business profile only allows for links between the network devices and a central access point.

18. The central controller of claim 14, wherein said database comprises, for each device of the network, a record indicating whether a device is capable of acting as a controller, and which transmission profiles are supported by said device.

19. The central controller of claim 14, further comprising:
    a transmitter configured to transmit said database to said controller-capable terminal device in case the central controller is not capable of supporting the transmission profile of said new terminal device.

20. The central controller of claim 14, further comprising:
    a processor configured to add a new record to said database whenever a new device is associated with the network.

21. A computer readable storage medium including computer program code to carry out the method defined in claim 1 when being executed on a computer and/or said central controller.

* * * * *